(12) United States Patent
Kearney

(10) Patent No.: US 10,349,778 B2
(45) Date of Patent: Jul. 16, 2019

(54) CHAFING DISH

(71) Applicant: Catalytic Burners Limited, Carlow (IE)

(72) Inventor: James Kearney, Carlow (IE)

(73) Assignee: Catalytic Burners Limited, Carlow (IE)

( * ) Notice: Subject to any disclaimer, the term of this patent is extended or adjusted under 35 U.S.C. 154(b) by 108 days.

(21) Appl. No.: 15/326,006

(22) PCT Filed: Mar. 5, 2015

(86) PCT No.: PCT/EP2015/054684
§ 371 (c)(1),
(2) Date: Jan. 12, 2017

(87) PCT Pub. No.: WO2016/008599
PCT Pub. Date: Jan. 21, 2016

(65) Prior Publication Data
US 2017/0196402 A1 Jul. 13, 2017

(30) Foreign Application Priority Data
Jul. 17, 2014 (GB) .................................. 1412750.0

(51) Int. Cl.
*A47J 36/06* (2006.01)
*A47J 36/24* (2006.01)
(Continued)

(52) U.S. Cl.
CPC .............. *A47J 39/02* (2013.01); *A47J 36/06* (2013.01); *A47J 36/24* (2013.01); *A47J 36/2405* (2013.01);
(Continued)

(58) Field of Classification Search
CPC ........ A47J 39/02; A47J 36/24; A47J 36/2405; A47J 36/2477; A47J 36/26; A47J 41/005
See application file for complete search history.

(56) References Cited

U.S. PATENT DOCUMENTS

| 2,207,814 A | 7/1940 | Ness et al. |
| 3,725,645 A * | 4/1973 | Shevlin ................. A47J 39/006 165/201 |

(Continued)

FOREIGN PATENT DOCUMENTS

| CN | 2226899 Y | 5/1996 |
| DE | 2755627 A1 | 6/1979 |

(Continued)

OTHER PUBLICATIONS

International Search Report PCT/EP2015/054684, dated May 13, 2015.
UKIPO Search Report GB 2528345, dated Aug. 26, 2015.

*Primary Examiner* — Fenn C Mathew
*Assistant Examiner* — Jennifer Castriotta
(74) *Attorney, Agent, or Firm* — Lodestone Legal Group; Jeromye V. Sartain

(57) ABSTRACT

The present invention relates to a more efficient chafing dish basin or Bain Marie for the hotel/catering and hospitality industry, that has a first exterior basin with a heating element, a second basin comprising an insulating base, one or more heat conductive layers and a third food basin. The first exterior basin has a heating element that extends through the insulation base, and heat conductive layer(s) to contact the bottom of the food basin. The heating element can be heated by naked flames or electrically. Sufficient heat is transferred to the food basin to obviate the need for water or allows for significantly less water to be used, increasing the safety profile of these chafing dishes.

15 Claims, 3 Drawing Sheets

(51) Int. Cl.
  *A47J 36/26* (2006.01)
  *A47J 36/34* (2006.01)
  *A47J 39/02* (2006.01)
  *A47J 41/00* (2006.01)

(52) U.S. Cl.
  CPC ....... *A47J 36/2477* (2013.01); *A47J 36/2483* (2013.01); *A47J 36/26* (2013.01); *A47J 36/34* (2013.01); *A47J 41/005* (2013.01)

(56) References Cited

U.S. PATENT DOCUMENTS

| | | | | |
|---|---|---|---|---|
| 4,063,068 A | * | 12/1977 | Johnson | A47J 27/004 219/386 |
| 2009/0065307 A1 | * | 3/2009 | Boyden | A47J 36/04 186/44 |
| 2011/0253699 A1 | | 10/2011 | Morin et al. | |

FOREIGN PATENT DOCUMENTS

| | | |
|---|---|---|
| GB | 2528345 A | 1/2016 |
| WO | 1997039667 A1 | 10/1997 |
| WO | 2003071909 A1 | 9/2003 |

\* cited by examiner

CHAFING DISH

RELATED APPLICATIONS

This application is a U.S. national stage entry under 35 U.S.C. § 371 from International PCT application Ser. No. PCT/EP2015/054684 filed on Mar. 5, 2015 and entitled "Chafing Dish," which itself claims priority and is entitled to the filing date of British application Ser. No. GB 1412750.0 filed Jul. 17, 2014, and entitled "A Food Container." The contents of the aforementioned applications are incorporated herein by reference.

FIELD OF THE INVENTION

The invention relates to a chafing dish basin, especially to an insulated chafing dish basin having a dedicated heating element that, when heated by fire or electrical means, heats one or more heat conductive layers within the basin to provide sufficient heat to food within the basin without the need for water, or substantially less water than normally required in chafing dishes.

BACKGROUND

There are many different variations of chafing dishes, also called Bain (or Baine) Maries available worldwide. All these chafing dishes have one feature in common; they all use hot or boiling water or other liquids in a lower basin typically made from food grade Stainless Steel to transfer heat to a food bearing basin in an even manner.

Currently all chafing dishes operate by putting water or other liquids in to the lower basin of the dish; heating the liquid to near boiling point in order to give a uniform heat to the food bearing basin, which may be an inner dish, to keep the food above 60° Celsius. These dishes are made entirely of a heat conducting metal like stainless steel for efficient heat transfer from an external heat source (such as a gas fire, liquid gel flame, candle or electrically generated heat source) applied to any part or parts of the basin underside. Unfortunately this leads to continual heat loss to the environment, requiring more heat to compensate for the cooling by heat loss. The mix of very hot water, up to boiling point and naked or uncontrolled flames is deemed a serious health and safety risk, particularly at busy events or buffets attended by children as well as adults. Reducing the amount of water used in chafing dishes or even obviating the need for water in chafing dishes or Bain Maries is clearly desirable. Furthermore, the currently available chafing dishes are energy inefficient because they lose so much heat from their side walls. Consequently, a more energy efficient chafing dish is also needed.

STATEMENT OF INVENTION

According to the first aspect of the invention there is provided a chafing dish basin comprising a first exterior basin comprising a heating element that extends upwardly through an insulating base of a second basin and one or more heat conductive layers positioned below a third food basin, wherein the third food basin is heated by the heat conductive layer when the heating element is heated by an external heat source and transfers heat to the heat conductive layer.

Preferably the heating element is contiguous with the first external basin. The heating element may be formed of a thermally conductive material. Preferably, the heating element is formed of the same material as the first exterior basin, such as stainless steel, or is composed of a plate or mesh of one or more of graphite, graphene, copper, silver, aluminium and combinations thereof, including alloys of one or more of copper, silver and aluminum.

More preferably the heating element is bell shaped.

Even more preferably the heating element has a diameter of from 20 to 120 mm, more preferably from 8 mm to 15 mm, even more preferably one of approximately 60 mm or 80 mm or 90 mm or 100 mm or 110 mm or 120 mm.

Most preferably the heating element has a diameter of approximately 60 mm.

Preferably the heating element has a height of from 10 mm to 50 mm, more preferably from 10 mm to 45 mm, even more preferably one of approximately 15 mm or 20 mm or 25 mm or 30 mm or 35 mm.

More preferably the heating element has a height of approximately 20 mm.

Preferably the top of the heating element is in intimate contact with the (third) food basin underside.

More preferably the heating element contacts the (third) food basin underside, which may be a food supporting plate, with a contact nub. The contact nub may be of from 0.2 mm to 0.6 mm in height and of from 5 mm to 20 mm in diameter.

More preferably the contact nub has a height of approximately 0.4 mm or 0.5 mm and a diameter of approximately 8 mm or 10 mm.

Most preferably the contact nub is spot welded to the underside of the (third) food basin.

Preferably the insulating base of the second basin, such as an insulating basin, is composed of insulating material selected from one or more of silica fibre, rock wool, fibre glass, zirconia, silica such as silica sand, silica-alumina or silica glass, gypsum, and an insulating polymeric material, such as polyurethane, particularly open celled polyurethane or another non-polyurethane insulating polymeric material.

More preferably the second basin has an insulating base composed of from 5 mm to 15 mm thick silica-alumina high temperature furnace insulation board and 5 mm to 15 mm thick vertical walls composed of gypsum plaster.

Preferably the one or more heat conductive layers is composed of a plate or mesh of one or more of graphite, graphene, copper, silver, aluminium and combinations thereof, including alloys of one or more of copper, silver and aluminium.

Most preferably the one or more heat conductive layers are composed of one or more plates or meshes of copper or aluminium or silver.

Preferably the heating element is heatable by an external heat source selected from gas burners, gel fuel or electrical heaters.

Preferably the chafing dish basin comprises a removable lid or a lid hingedly attached thereto.

More preferably the lid is thermally insulated, most preferably the lid is insulated with material selected from one or more of silica fibre, alumina, rockwool, fibre glass, zirconia, silica such as silica sand, silica-alumina or silica glass, gypsum, such as gypsum plaster and insulating polymer material such as polyurethane or non-polyurethane insulating polymeric material.

According to a second aspect of the current invention there is provided a method of manufacture of a chafing dish basin comprising at least the steps of:

1) forming a heating element at the base of a first exterior basin with a diameter of from 10 mm to 120 mm and a height of from 10 mm to 60 mm, 2) placing a second basin comprising an insulating base into the heat resistant basin with an aperture fitting around the heating element,
3) placing the one or more heat conductive layers on the insulating base,
4) placing a food basin on the heat conductive layer, the underside of the food basin contacting the top of the heating element, and
5) forming a water tight connection between the food basin and the first exterior basin.

BRIEF DESCRIPTION OF FIGURES

FIG. 2A is a magnified view of the heating element 80 of chafing dish basin 10.

DETAILED DESCRIPTION

Figure 1:
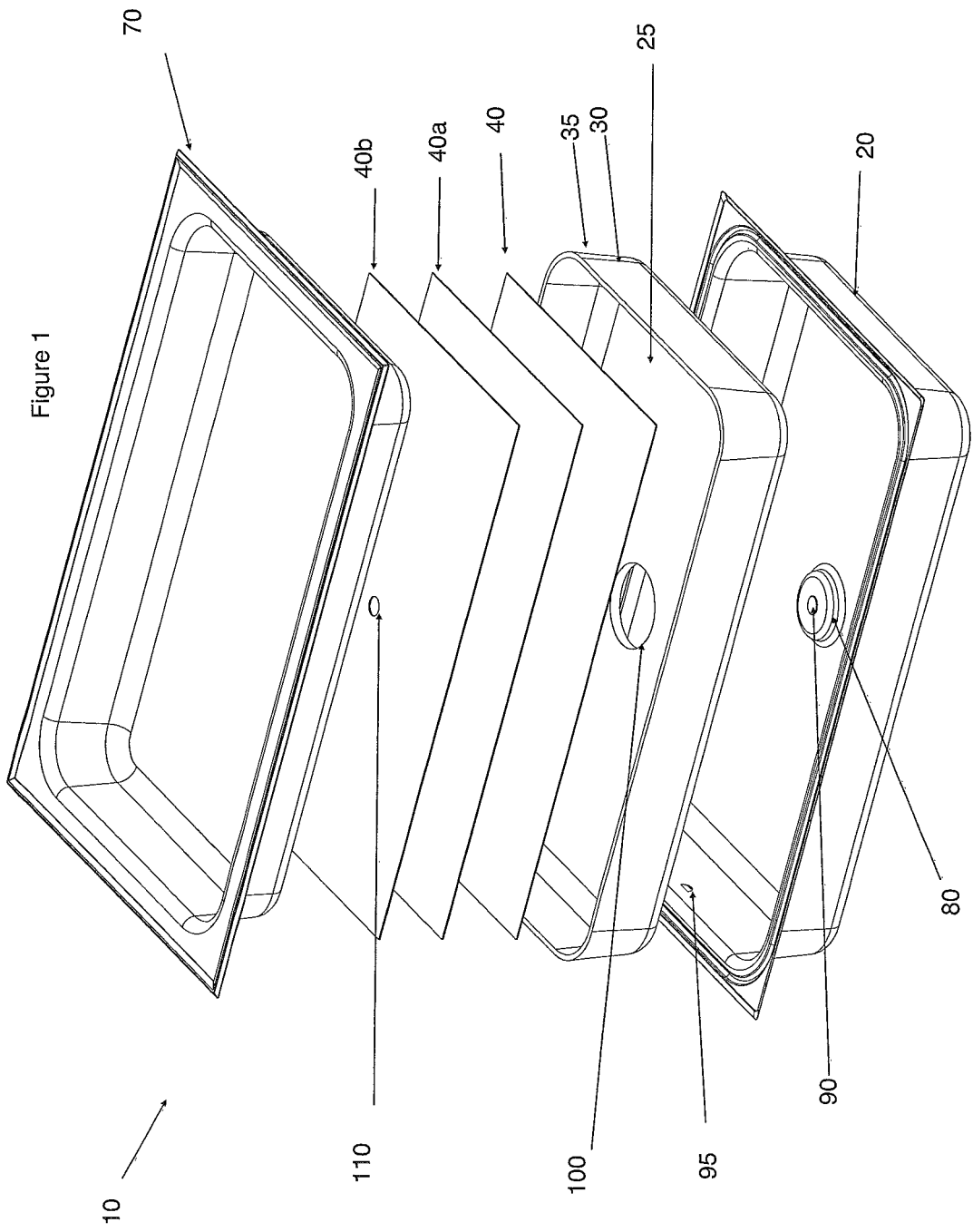
FIG. 1 is an exploded view of chafing dish basin 10.

The invention will now be described by way of example only, with reference to the accompanying figures, in which FIG. 1 shows a chafing dish 10 (for instance of dimensions 62.5 cm×31.25 cm×10 cm) with first exterior basin 20, which may be a 0.5 mm thick stainless steel basin.

Second basin 30 is provided. Second basin 30 may be an insulating basin which has an insulating base 25 of 15 mm thick silica-alumina high temperature furnace insulating board, with aperture 100 and walls 35, which are typically insulated walls. Aperture 100 is aligned to accommodate heating element 80. The second basin 30 is configured such that at least the insulating base 25 of the second basin fits within the first exterior basin 20. The insulating base 25 can be in contact with the first exterior basin 20.

One or more heat conductive layers 40 are located between the insulating base 25 and a food basin 70, discussed below. A first heat conductive layer 40, which may be of 0.05 mm thick copper, is provided on the second basin 30. The first heat conductive layer 40 can be provided as a separate sheet. The first heat conductive layer 40 can cover at least the insulating base of the second basin 30. A second heat conductive layer 40a, which may be of 0.05 mm thick graphite, can be provided. The second heat conductive layer can be placed on top of the first heat conductive layer 40, for instance such that the first heat conductive layer is between the insulating base 25 and the second heat conductive layer 40a. The second heat conductive layer can be provided as a coating on the first heat conductive layer 40 or as a separate sheet. A third heat conductive layer 40b, which may be, for instance, 0.4 or 0.5 mm thick aluminium, can be provided. The third heat conductive layer can be placed on top of the second heat conductive layer 40a, for instance such that the second heat conductive layer is between the first heat conductive layer 40 and the third heat conductive layer 40b. The third heat conductive layer 40b (or whichever heat conductive layer is immediately adjacent to the food basin 70, discussed below) can be provided as a coating, such as on the underside of food basin 70, for instance as an electroplated copper layer, or the third heat conductive layer 40b may be provided as a separate sheet, such as an aluminium sheet.

Each heat conductive layer 40, 40a, 40b i.e. first, second and third heat conductive layers can be provided with an aperture 110. Aperture 110 of the third heat conductive layer 40b and the corresponding apertures of the first and second heat conductive layers 40 and 40a (which are not visible from the perspective of FIG. 1) are situated to accommodate heating element 80, which can extend through each of the heat conductive layers 40, 40a, 40b. Thus, the apertures 110 of the heat conductive layers 40, 40a, 40b may be in alignment to accommodate the heating element 80. Heating element 80 should be in thermal contact with each of the heat conductive layers 40 via the aperture through which the heating element extends. Thus, heating element 80 is in contact with the perimeter of each aperture in each heat conductive layer.

A food basin 70, which may be of 0.5 mm thick stainless steel is provided. Food basin 70 is configured so that at least a part fits within second basin 20. At least a part, preferably all, of the lower surface of the base of food basin 20, such as a base of food basin 20, should be in contact with the uppermost heat conductive layer, in this case third heat conductive layer 40b.

A heating element 80 is also provided. Heating element 80 may be formed of a thermally conductive material, such as that provided for the one or more heat conductive layers 40. The heating element 80 may have a bell shape, for instance a bell shape with a bottom widest diameter of 100 mm and top narrowest diameter of 11.5 mm and a height of 20 mm from bottom to the top of the bell. A contact nub 90 may be embossed on the chafing dish interior facing surface of heating element 80. The contact nub 90 may have a diameter of 10 mm and a height of 0.4 mm. Aperture 100 of the insulating base 25 of the second basin 30 accommodates the heating element 80. The apertures of the first and second heat conductive layers 40 and 40a are not visible in FIG. 1 and also accommodate the heating element 80. Aperture 110 of the third heat conductive layer 40b may be of smaller diameter than aperture 100 to accommodate the contact nub 90 allowing contact between the nub 90 and the underside of food basin 70.

In an alternative embodiment, the insulating walls 35 of second basin 30 can be generated after assembly of the insulating base 25, conductive layers 40, 40a, 40b and food basin 70 of chafing basin 10. In this embodiment, an insulated base 25 is provided without walls. The walls 35 of the second basin 30 are created by pouring a liquid insulating material, e.g. gypsum plaster, through aperture 95 provided in a wall of the first exterior basin 20. Typically aperture 95 is located such that liquid insulating material injected can gravitationally flow to contact the insulating base 25 and fill an interstitial space defined by the walls of the first exterior basin 20, the walls of the food basin 70, the sides of the heat conductive layers 40 and the insulating base 25. The liquid insulating material may be of a type which can solidify after application. Aperture 95 can be then sealed once the filling has been completed. Hardening of an insulating material of the gypsum plaster removes air and forms the insulated walls 35 of the second basin. This reduces the risk of damage to the insulating basin 30 and the chafer basin 10 by contraction and expansion due to heating and cooling during and after use of the chafing dish basin 10.

Figure 2:
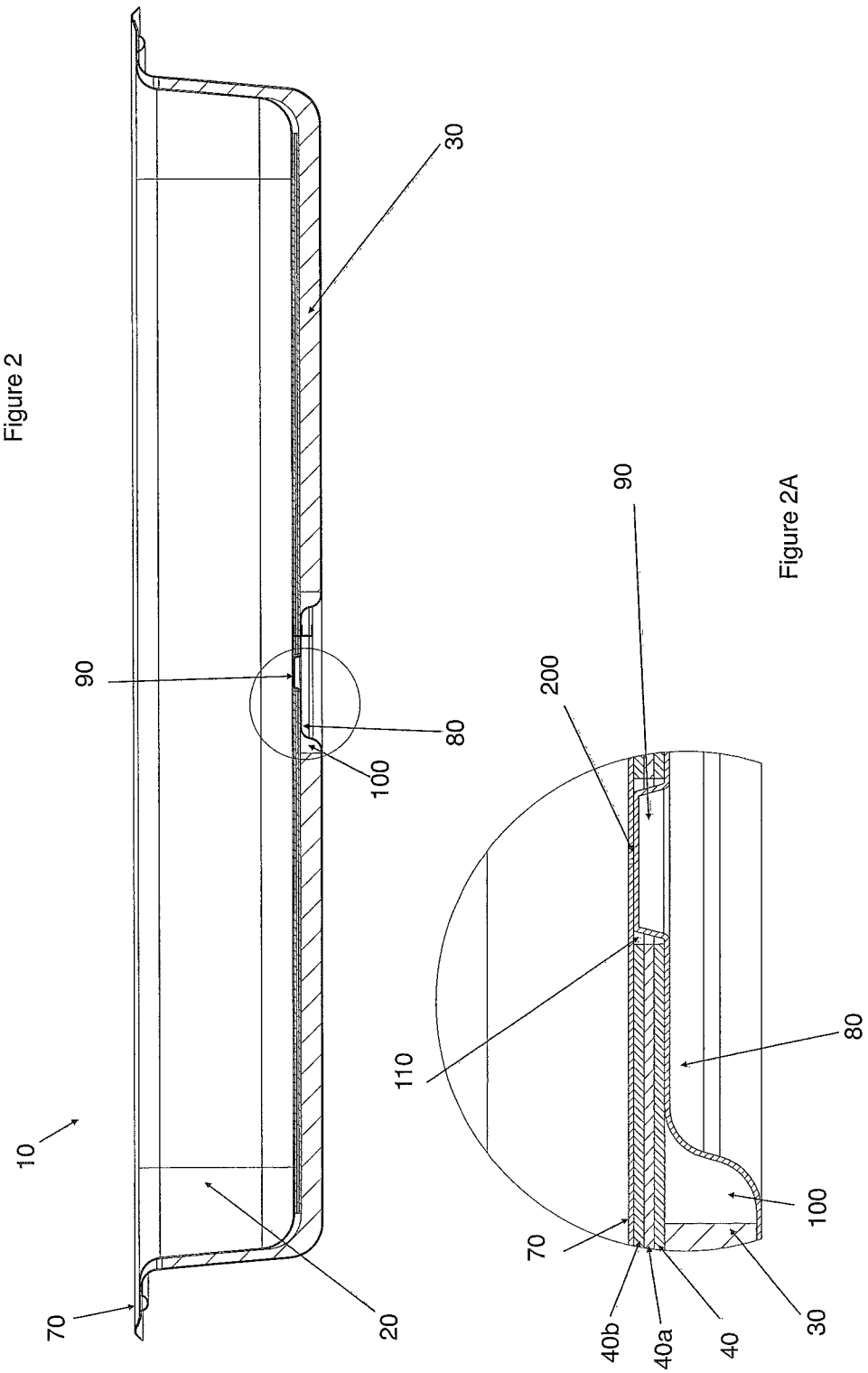
FIG. 2 is a cross section through the chafing dish basin 10.

FIG. 2 shows a cross section through chafing dish basin 10 and FIG. 2A shows a magnified view of the heating element 80 integral with the exterior stainless steel basin 20, second basin 30 comprising insulating base 35, and heat conductive layers 40 (0.05 mm copper sheet), 40a (0.05 mm graphite sheet) and 40b (0.4 or 0.5 mm aluminium sheet) accommodating the heating element 80 through their respective apertures 100 and 110. The contact nub 90 is in direct contact with, and spot welded to, the underside of food receiving basin 70 at contact point 200, through the apertures of layers 40, 40a and 40b.

Figure 3:
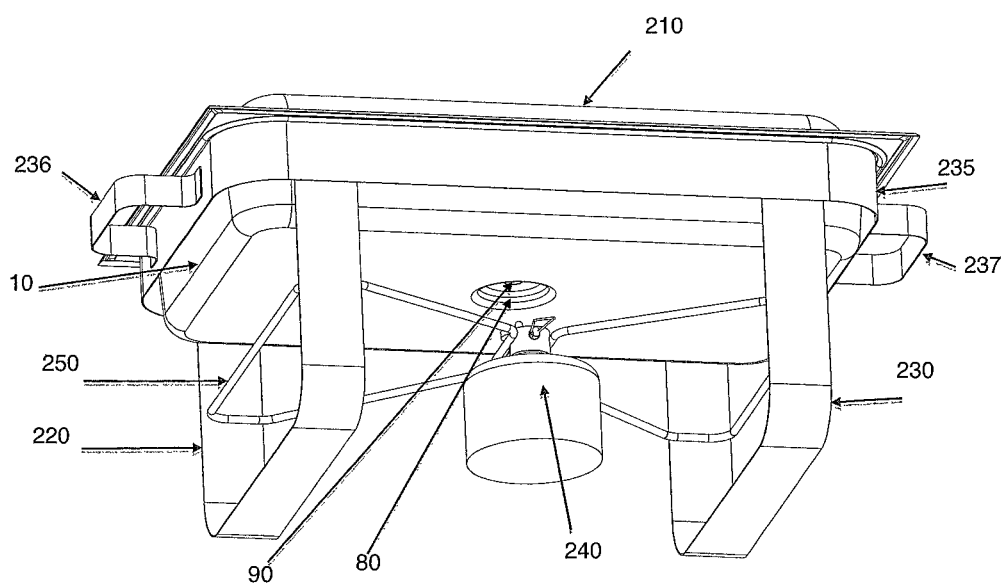
FIG. 3 is bottom up view of the chafing dish 10 in a standard chafing dish support 235, with an insulated lid 210 and butane burner 240.

FIG. 3 shows chafing basin 10 with an insulated chafer lid 210 on legs 220 and 230 of a standard chafer support 235, with handles 236 and 237, being heated by a standard butane burner 240 which is held in position by carrier 250, directly below the heating element 80 and the underside of nub 90.

As can be seen from FIG. 1, assembly of the basin 10 is achieved by stacking the second basin 30, heat conductive layers 40, 40a and 40b and food basin 70 into the stainless steel exterior basin 20, aperture 100 in the second basin 30 and apertures in the heat conductive layers 40 and 40a (not shown) accommodate the 20 mm tall bell shaped heating element 80.

In FIG. 2A it can be seen that aperture edges of layers 40, 40a and 40b are in direct contact with the external surface of heating element 80, importantly contact nub 90 contacts the underside of the food basin 70 at contact point 200 (this contact point 200 can be made permanent by spot welding) through aperture 110 of third heat conductive layer 40b. The contacts between the bell shaped heating element 80 and the heat conductive layers 40, 40a and 40b are required for efficient heat transfer from the heating element 80 to the heat conductive layers 40, 40a and 40b while being heated by an external heat source which in the embodiment of FIG. 3 is a butane burner flame. Furthermore, contact between the nub 90 and the underside of food basin 70 provides further efficient heat transfer during the heating of heating element 80. The food basin 70 and the exterior basin 20 are pressed and bonded together in an air tight manner to form the chafer dish basin 10.

In use the chafing dish basin 10 with food to be heated in the basin 70, and without water in the basin 70, is covered by a lid 210, and placed into a standard chafer support 235; a butane burner is positioned below the heating element 80 and lit, heat is then transferred directly from the heating element 80 to the bottom, first heat conductive layer 40. Heat is then transferred sequentially and directly between the first and second heat conductive layers, 40 and 40a, and the second and third conductive layers 40a and 40b. The uppermost third heat conductive layer 40b transfers heat directly to the underside of food basin 70 in a uniform manner. Further heat is transferred from contact nub 90 to the food basin 70 at contact site 200.

By using an insulating layer with a heating element 80 extending through it to heat a heat conductive layer, which in turn heats the base of the food basin, rapidly and evenly, numerous advantages are provided by the current invention to the end user, including any heat entering the chafing system is rapidly conducted throughout the chafing dish ensuring no hot spots or cold spots that can spoil food; no water or if water is used in the basin it is significantly reduced in volume, due to the insulation used, the water need not reach boiling temperature to maintain the food temperature at 60° C. or above; additionally due to the reduced power used. Further economies are provided when these devices are used indoors, as currently available chafing dishes use so much energy to maintain food temperature which is lost from the basins due to lack of any insulation, room temperatures can reach uncomfortably hot levels, triggering the use of air conditioning devices.

As there is now no water present as a heat transfer medium to the food basin there is a vast difference in weight allowing easy and safe operation of the chafing dish if it is required to move it to other locations. Thus, the chafing dish basin may be free of water. The chafing dish basin may therefore not comprise a water reservoir, for instance between the first exterior basin and third food basin. Furthermore as the chafing dish is now fully insulated it uses the same energy requirements whether operating indoors or outdoors. Presently operators, as a rule use 50% more heat when using chafers outdoors than indoors.

When the chafing dish of the invention provided with an insulating second basin formed by the insulating base and insulating walls is combined with an insulated chafing dish lid, it can also be used as a cold store device by leaving the complete unit to cool in a cold room or freezer before use and thus keep cold food cold in hot weather. Alternatively a dry ice capsule can be used within the bell shaped heating element or inside the food basin.

Various further aspects and embodiments of the present invention will be apparent to those skilled in the art in view of the present disclosure.

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

Modifications of the above embodiments, further embodiments and modifications thereof will be apparent to the skilled person on reading this disclosure, and as such these are within the scope of the present invention.

The invention claimed is:

1. A chafing dish basin comprising an exterior first basin comprising a heating element that extends upwardly through an insulating base of a second basin and one or more heat conductive layers positioned below a food basin, wherein the food basin is heated by the one or more heat conductive layers when the heating element is heated by an external heat source and transfers heat to the one or more heat conductive layers, wherein a top of the heating element is in intimate contact with an underside of the food basin.

2. The chafing dish according to claim 1 wherein the heating element is contiguous with the first basin.

3. The chafing dish basin according to claim 2 wherein the heating element is bell shaped.

4. The chafing dish basin according to claim 1 wherein the one or more heat conductive layers are composed of a plate or mesh of graphite or graphene, copper, silver and aluminum or alloys and combinations thereof.

5. The chafing dish basin according to claim 4 wherein the insulating base is comprised of a material selected from one or more of silica fibre, alumina, rockwool, fibre glass, zirconia, silica such as silica sand, silica-alumina or silica glass, gypsum, and an insulating polymer material such as polyurethane.

6. The chafing dish basin according to claim 1 wherein the heating element is heatable by an external heat source selected from a gas burner, gel fuel or an electrical heater.

7. The chafing dish basin according to claim 1 comprising a removable lid.

8. The chafing dish according to claim 7 wherein the lid is thermally insulated.

9. The chafing dish basin according to claim 8 wherein the lid is insulated with material selected from one or more of silica fibre, alumina, rockwool, fibre glass, zirconia, silica such as silica sand or silica glass, and an insulating polymer material such as polyurethane.

10. The chafing dish basin according to claim 1 comprising a lid hingedly attached to the chafing dish basin.

11. The chafing dish according to claim 10 wherein the lid is thermally insulated.

12. The chafing dish basin according to claim 11 wherein the lid is insulated with material selected from one or more of silica fibre, alumina, rockwool, fibre glass, zirconia, silica such as silica sand or silica glass, and an insulating polymer material such as polyurethane.

13. A method of manufacture of a chafing dish basin according to claim 1 comprising at least the steps of:
- forming the heating element at a base of the first basin with a diameter of from 10 mm to 120 mm and a height of from 10 mm to 120 mm;
- placing the second basin comprising the insulating base into the first basin with an aperture fitting around the heating element;
- placing the one or more heat conductive layers on the insulating base;
- placing the third food basin on the one or more heat conductive layers, the underside of the food basin contacting a top of the heating element; and
- forming a water tight connection between the food basin and the first basin.

14. A chafing dish basin comprising an exterior first basin comprising a heating element that extends upwardly through an insulating base of a second basin and one or more heat conductive layers positioned below a food basin, wherein the one or more heat conductive layers are composed of a plate or mesh of graphite or graphene, copper, silver and aluminum or alloys and combinations thereof, and wherein the food basin is heated by the one or more heat conductive layers when the heating element is heated by an external heat source and transfers heat to the one or more heat conductive layers.

15. The chafing dish basin according to claim 14 wherein the insulating base is comprised of a material selected from one or more of silica fibre, alumina, rockwool, fibre glass, zirconia, silica such as silica sand, silica-alumina or silica glass, gypsum, and an insulating polymer material such as polyurethane.

* * * * *